United States Patent [19]

Hafele

[11] 4,034,900

[45] July 12, 1977

[54] SPRAY PUMP ASSEMBLY

[75] Inventor: Robert X. Hafele, Baton Rouge, La.

[73] Assignee: Ethyl Corporation, Richmond, Va.

[21] Appl. No.: 682,730

[22] Filed: May 3, 1976

[51] Int. Cl.[2] .......................................... G01F 11/06

[52] U.S. Cl. ............................... 222/321; 222/385; 239/333; 417/550; 417/566

[58] Field of Search .................. 239/331, 332, 333; 222/321, 385, 383; 417/550, 566, 457

[56] References Cited

U.S. PATENT DOCUMENTS

| | | | |
|---|---|---|---|
| 2,362,080 | 11/1944 | Martin | 222/321 |
| 3,187,960 | 6/1965 | Gorman | 417/566 X |
| 3,991,914 | 11/1976 | Kotuby | 239/333 X |

*Primary Examiner*—John J. Love
*Attorney, Agent, or Firm*—Donald L. Johnson; John F. Sieberth; David L. Ray

[57] ABSTRACT

A finger-operated spray pump assembly including a compression chamber, a generally cylindrical valve slidably fitted inside the compression chamber, a piston slidably fitted inside the valve, and a spring fitted inside of the valve for urging the piston away from the bottom end of the valve.

12 Claims, 4 Drawing Figures

SPRAY PUMP ASSEMBLY

BACKGROUND OF THE INVENTION

The present invention relates to liquid atomizer pumps. In particular, this invention relates to small, hand-held, finger-operated dispensers involving pump assemblages as distinguished from pressurized aerosol containers and valves.

Atomizer pumps are known in which the dipper tube immersed in the container that holds the liquid to be vaporized is connected to an atomizer nozzle through a piston and cylinder unit fitted with valves to constitute a suction and delivery pump. At least one of these valves generally consists of a ball held to its seat by the force of gravity. Consequently, such vaporizers operate only when vertical, with the nozzle higher than the container. If such containers were turned upside down and the vaporizer operated, it is possible for all of the liquid contained in the dip tube and the cylinder to leak out through the nozzle.

Atomizer pumps of the prior art generally require three or four critical areas of close fit. Also, most atomizer pumps have numerous small parts which frequently make assembly difficult.

SUMMARY OF THE INVENTION

In accordance with the present invention, there is provided a finger-operated pump assembly including a compression chamber, a generally cylindrical valve slidably fitted inside the compression chamber, a piston slidably fitted inside of the valve, and a spring fitted inside the valve for urging the piston away from the bottom end of the valve.

DESCRIPTION OF THE PREFERRED EMBODIMENTS

Figure 1:
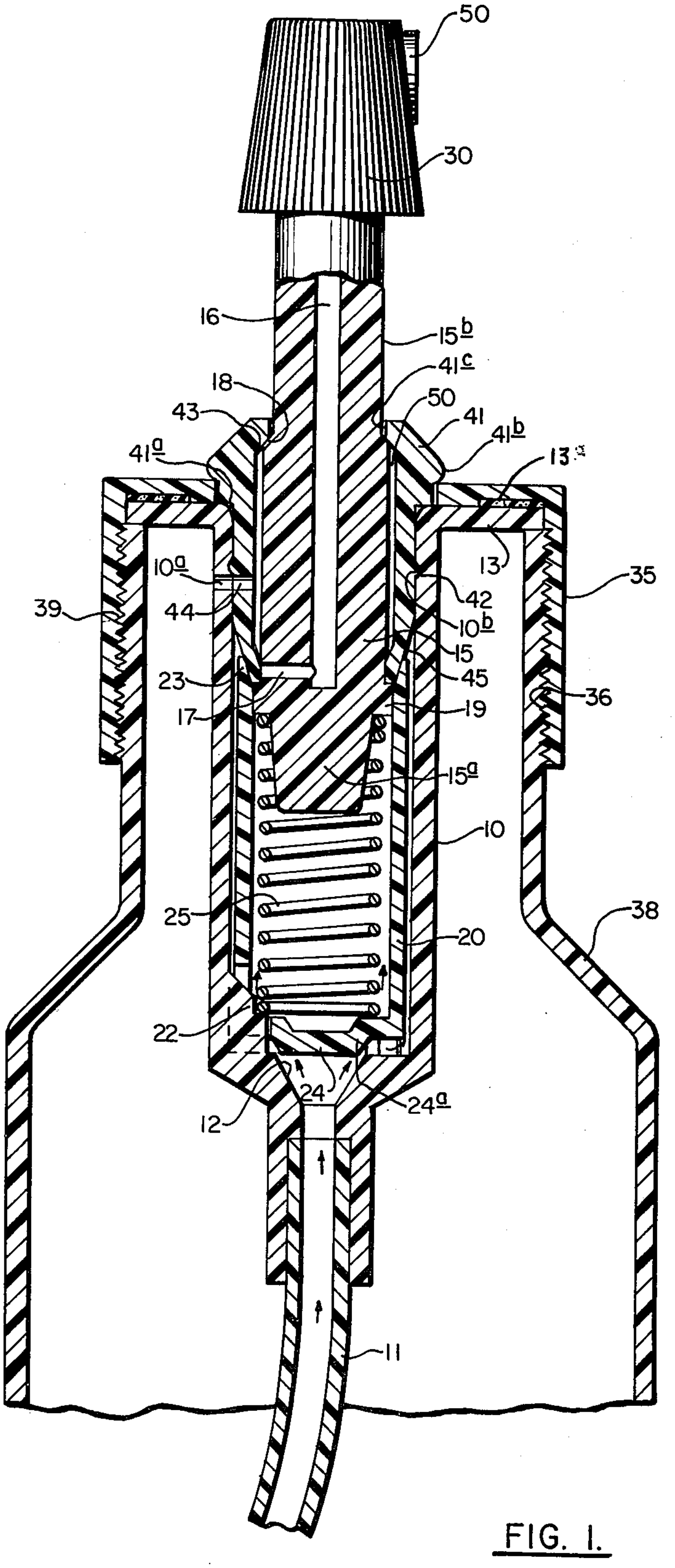
FIG. 1 is an enlarged fragmentary sectional view showing details of the pump.
Figure 2:
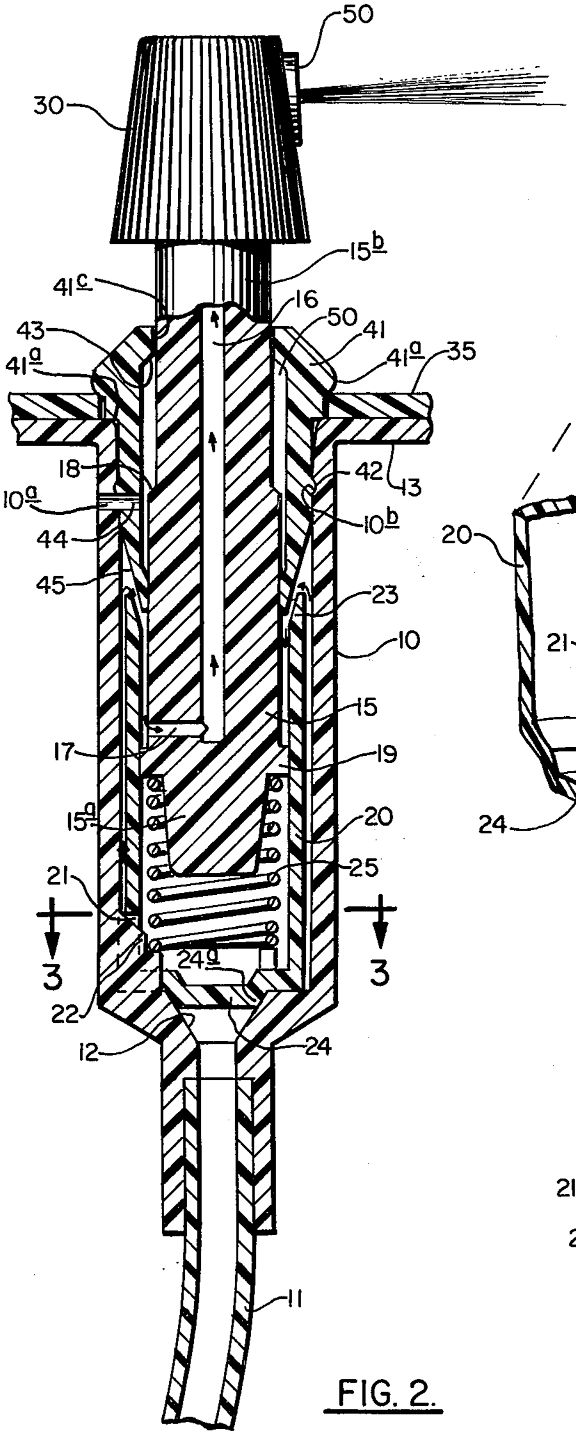
FIG. 2 is an enlarged fragmentary sectional view of the pump with the piston depressed.

Referring now to the drawings, FIG. 1 shows fluid entering the atomizer pump, and FIG. 2 shows fluid being sprayed from the pump. The pump assembly includes a closure 35 adapted to be secured to the container 38 to form a cap or stopper for the container. The closure 35 may be tapped to form threads 36 therein so that the closure may be screwed over threads 39 on the neck of the container. If desired, other conventional means of attaching the closure 35 to container 38 may be used such as snapping, force fitting, and the like.

Inside closure 35 there is provided a pumping or compression chamber 10. The compression chamber extends at its lower end to register with dipper tube 11.

Integrally formed in the upper end of the compression chamber 10 is outer flange 13 held to closure 35 by insert 41. A rubber gasket 13*a* is located between flange 12 and the top of closure 35. A portion of insert 41 extends into compression chamber 10 and is attached thereto by means of a lower annular bead 42 which snaps into a groove 10*b* located on the inside surface of compression chamber 10. An outer shoulder 41*a* of insert 41 contacts the top of flange 13. Closure 35 is held loosely and rotatably between upper annular bead 41*b* of insert 41 and the top of flange 13. Normally the cap is attached to the pump during assembly and shipped to the customer as a unit.

Slidably located inside of insert 41 is piston 15. The upper motion of piston 15 is limited by the inner, upper, tapered shoulder 43 of insert 41. Upper shoulder 43 abuts tapered shoulder 18 of piston 15 when piston 15 is in the upward position. Clearance provided between the upper portion of piston 15 and the inside wall of insert 41 provides an air chamber 50. Clearance is also provided between the upper portion 15*b* of piston 15 and the opening 41*c* in the upper end of insert 41. Therefore, as piston 15 is moved downwardly, atmospheric air can enter the interior of container 38 through opening 41*c*, air chamber 50, passage 44 in the wall of insert 41, and passage 10*a* in compression chamber 10.

An annular collar 19 is integrally formed adjacent the lower end of piston 15. Collar 19 slidably engages the inside wall of sliding cylindrical valve 20. In the upward position, the top of collar 19 abuts the tapered lower end 45 of insert 41 to limit the upward motion of piston 19. The outer portion of piston 15 above collar 19 makes sliding contact with the inside wall portion of the lower end 45 of insert 41.

The dimensions of collar 19 and sliding cylindrical valve 20 may be selected such that valve 20 will be held in the position shown in FIG. 1 when the pump is at rest. However, a slight clearance may be provided between collar 19 and valve 20 to permit valve 20 to rest in the position shown in FIG. 2.

Piston 15 has a passageway molded therein for conveying liquid contained in the space above collar 19, and between piston 15 and the inside of valve 20, to the atomizer nozzle as piston 15 is depressed. The passageway is made up of transverse passage 17 and longitudinal passage 16. When the piston 15 is in the rest position shown in FIG. 1, and the container 38 is inverted, no fluid can escape because passage 17 is sealed against the inside of the lower end 45 of insert 41.

Figure 4:
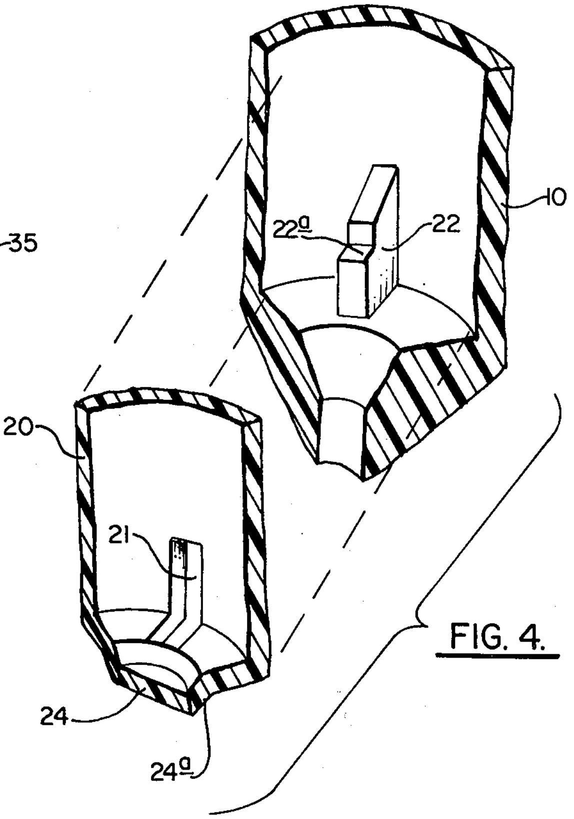
FIG. 4 is a partly cut-away, perspective view of the compression chamber and cylindrical valve.
Figure 3:
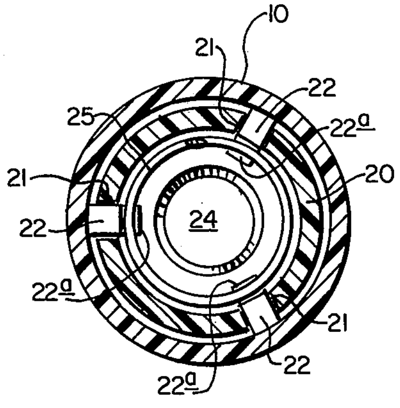
FIG. 3 is a cross-sectional view taken along line 3—3 of FIG. 2.

Sliding cylindrical valve 20 is located inside compression chamber 10. Sliding valve 20 has an outwardly tapered upper, inner wall surface 23 which makes sealing contact with the inwardly tapered outer surface of the lower end 45 of insert 41 during the time when fluid is entering the compression chamber through dipper tube 11 as shown in FIG. 1. On the upstroke of piston 15, fluid flows into the interior of valve 20 through a plurality of L-shaped openings 21 located in the sides and bottom of valve 20 as can be seen in FIGS. 2, 3 and 4. After compression chamber 10 is filled, sliding valve 20 will assume the position shown in FIG. 2 or FIG. 3 depending upon the relative dimensions of collar 19 and valve 20 as explained above. Integrally formed at the lower end 24 of valve 20 is a tapered surface 24*a* which makes a sealing contact with the tapered surface 12 of compression chamber 10 when piston 15 is being depressed as in FIG. 2 to spray the liquid from button 30.

Partially located within the openings 21 are guides 22 which are integrally formed in the lower wall of compression chamber 10. Guides 22 have a shoulder 22*a* upon which rests the bottom of a compression spring 25. The upper end of spring 25 abuts the bottom of the collar 19 of piston 15 and fits around the lower end 15*a* of piston 15. As is apparent, there is no spring pressure exerted upon cylindrical valve 20. The spring 25 exerts force only against the shoulder 22*a* at the lower end of compression chamber 10 and against the bottom of collar 19. The height of the shoulders 22*a* and the width of the L-shaped openings 21 are adjusted to permit the desired rate of flow of liquid from dipper tube 11 into the interior of the cylindrical valve 20 when the lower end 24 of the valve is lifted from its seat.

When the finger is removed from the spray button 30 at the end of the downstroke, piston 15 is forced upwards by spring 25 and dipper tube 11 is immersed in a liquid, the reduced pressure within compression chamber 10 will cause valve 20 to unseat and move upwardly and allow liquid to enter compression chamber 10 through dipper tube 11 and openings 21 in the lower wall of the valve 30. However, when the piston 15 is forced downward as indicated in FIG. 2, the increased pressure within the interior of the cylindrical valve 20 forces the tapered surfaces 24*a* of the lower end 24 of valve 20 downward against the bottom 12 of compression chamber 10 and acts as a check valve to prevent flow of liquid back into the container. As piston 15 continues downward, the liquid located inside the lower portion of the sliding valve 20 is forced downwards through holes 21, upwards through the annulus formed between the inside wall of pressure chamber 10 and the outside wall of valve 20, over the now open top end of valve 20 into the annular space located above collar 19 between the inside wall of valve 20 and exterior wall of the piston 15, and through transverse passage 17 and longitudinal passage 16 to a conventional actuator button 30 and atomizer nozzle 50.

From the foregoing, it can be seen that the pump of the present invention has numerous advantages over prior art finger spray pumps. The present pump has generally fewer parts than previous pumps. Also, the parts are of relatively large size and do not require that their dimensions be controlled to the narrow range necessary in prior art pumps. The foregoing advantages permit easy, automated assembly of the pump parts, thus reducing assembly and reject costs. The pump is substantially leakproof in its normal rest position and, thus, can be attached to the container on the filling line and shipped and stored under conditions which cause increased pressure to be created in the container (e.g., exposure to above ambient temperature, storage in the inverted position) without substantial leakage. The elimination of the conventional metal ball check valves in the upper and lower ends of the pump avoids assembly problems, possible corrosive problems and allows the pump to be operated on its side or even inverted, if desired.

What is claimed:

1. A finger-operated pump assembly connectable to a container means comprising:

a. compression chamber means having a fluid inlet, b. valve means loosely fitted inside the compression chamber means, said valve means being generally cylindrical in shape and hollow inside said valve means being movable between a first position in which said valve means closes said fluid inlet and a second position in which said fluid inlet is open, c. piston means slidingly fitted inside said valve means, said piston means having a passageway for conveying liquids from said compression chamber, and d. resilient means fitted inside said valve means to urge said piston means away from one end of said valve means.

2. The pump assembly of claim 1 wherein said valve means is generally open at the top.

3. The pump assembly of claim 2 wherein a series of openings are located in the bottom of said valve.

4. The pump assembly of claim 3 wherein said valve means has a tapered bottom portion.

5. The apparatus of claim 1 wherein said piston means has collar means on the lower end thereof which slidably engages the interior of said valve means.

6. The apparatus of claim 5 wherein said piston means has passageway means therein for conveying liquids contained above said collar means and inside said valve means to an atomizing nozzle.

7. The apparatus of claim 1 wherein insert means is located in the top end of said compression chamber means for slidingly receiving the upper portion of said piston means.

8. The pump assembly of claim 7 wherein said insert means has hole means therein aligned with hole means in said compression chamber means for admitting air from the atmosphere to the interior of said container means.

9. A finger-operated pump assembly connectable to a container means comprising:

a. compression chamber means having hole means and a fluid inlet therein;

b. valve means loosely fitted inside the compression chamber means, said valve means being generally cylindrical in shape, hollow inside and generally open at the top, the bottom of said valve having a series of openings therearound, said valve means being movable between a first position in which said valve means closes said fluid inlet and a second position in which said fluid inlet is open;

c. piston means slidingly fitted inside said valve means, including collar means on the lower end thereof which slidably engages the interior of said valve means, said piston means having passageway means therein for conveying liquids contained above said collar means and inside said valve means to an atomizing nozzle means; and, d. resilient means fitted inside said valve means to urge said piston means away from one end of said valve means.

10. The pump assembly of claim 9 wherein said valve means has a tapered bottom portion.

11. The apparatus of claim 9 wherein insert means is located in the top end of said compression chamber means for slidingly receiving the upper portion of said piston means.

12. The pump assembly of claim 11 wherein said insert means has hole means therein aligned with said hole means in said compression chamber means for admitting air from the atmosphere to the interior of said container means.

* * * * *